UNITED STATES PATENT OFFICE.

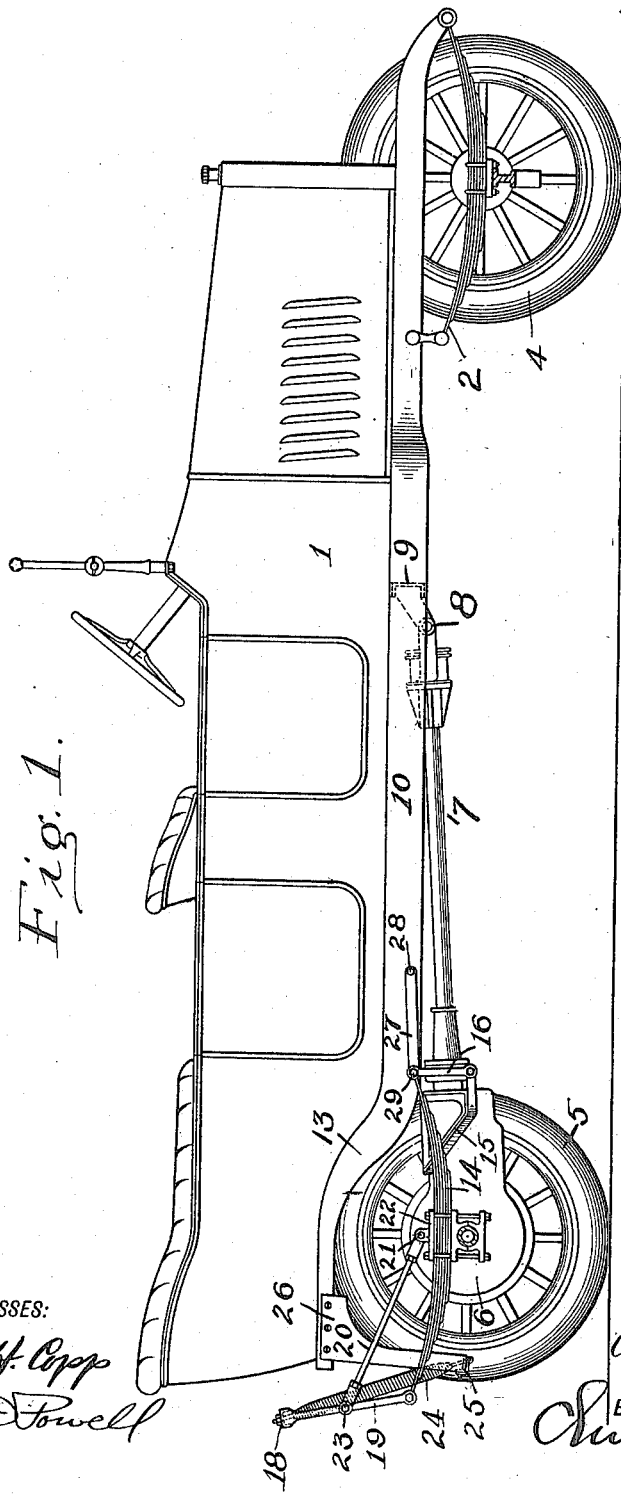

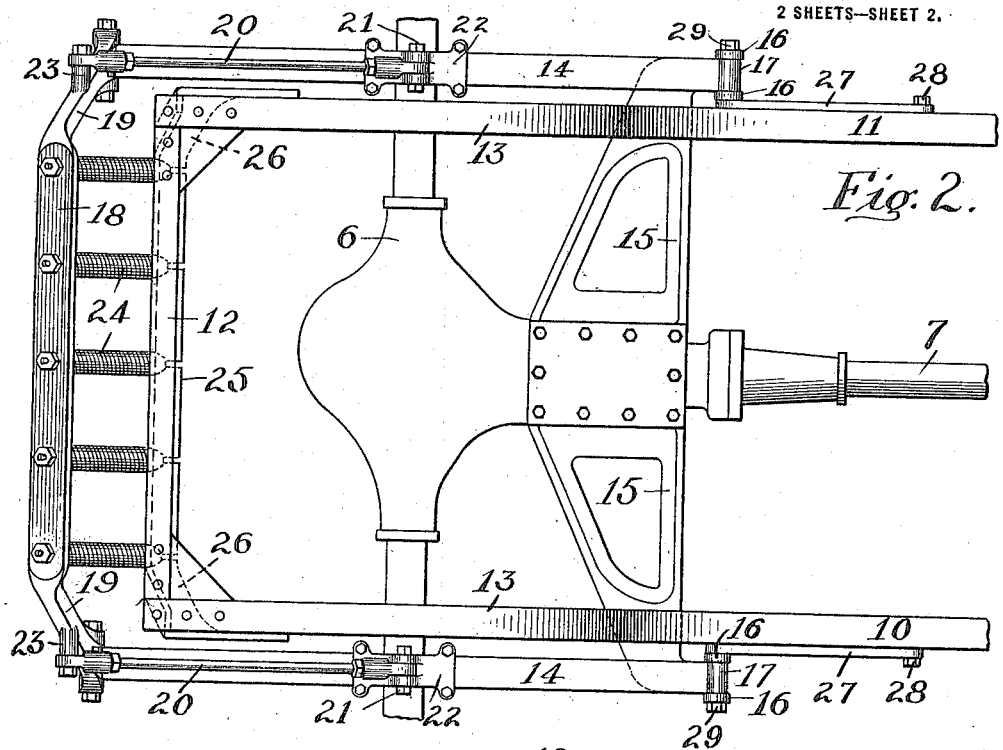
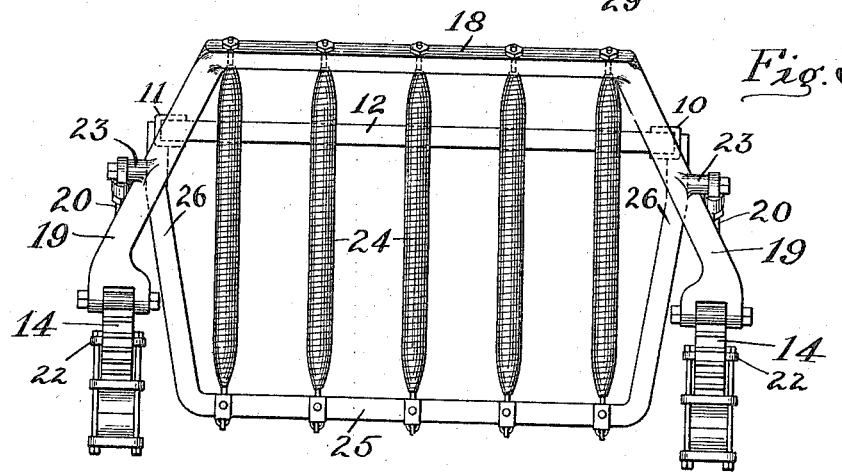

CHARLES J. PEMBROKE, OF ROCHESTER, NEW YORK.

VEHICLE.

1,216,486.  Specification of Letters Patent.  Patented Feb. 20, 1917.

Application filed July 3, 1916. Serial No. 107,218.

*To all whom it may concern:*

Be it known that I, CHARLES J. PEMBROKE, of Rochester, in the county of Monroe and State of New York, have invented certain new and useful Improvements in Vehicles; and I do hereby declare the following to be a full, clear, and exact description of the same, reference being had to the accompanying drawings, forming a part of this specification, and to the reference characters marked thereon.

My present invention relates to vehicles, particularly automobiles, and has for its object to provide an improved means for mounting or supporting the frame thereof on the running gear, whereby the riding qualities of the vehicle are improved and greater ease and comfort afforded the passenger when driving over both smooth and uneven roads. To these and other ends the invention consists in certain improvements and combinations of parts, all as will be hereinafter more fully described, the novel features being pointed out in the claims at the end of the specification.

In the drawings:

Figure 1 is a side elevation showing the vehicle provided with one adaptation of a frame supporting mechanism constructed in accordance with my present invention;

Fig. 2 is an enlarged plan view of the rear of the vehicle, the body thereof being removed, and Fig. 3 is a rear elevation of the frame supporting device.

Similar reference characters throughout the several views indicate the same parts.

My invention comprehends employing a duplex set of springs, one set being carried on the running gear and, in the case of an automobile, supported on the mechanism connecting the rear wheels, the other set of springs being carried by the first mentioned set and in turn supporting the load carrying member or frame of the vehicle on which the body is mounted. This mechanism is preferably located at the rear of the vehicle, the forward end of the body-carrying frame thereof being supported on the forward pair of wheels, the axes of which provide pivots for the rocking of the vehicle frame, which is permitted by the duplex springs.

In illustrating my present invention I have shown an automobile comprising the body 1, carried on the frame supported at its forward ends by the usual springs 2, mounted on the axle 3 connecting the forward or steering wheels 4. The rear or driving wheels indicated by 5 are driven in the usual or any preferred manner by the engine or motor, which is not illustrated, but is preferably carried on the forward end of the frame. The driving or impelling force imparted by the wheels 5 is transmitted to the frame of the machine through the rear axle-housing 6 and the extending part 7 thereon, which may be utilized to accommodate the driving shaft which extends rearwardly from the motor to the differential driving elements located in the housing 6 and by means of which movement is imparted to the driving wheels 5. The member, or housing 7, preferably extends forwardly to a point beyond the center of the vehicle frame to which it is pivotally connected, as indicated at 8, to a cross-piece 9, this arrangement of the parts permitting the thrust of the driving wheels to be transmitted to the frame of the vehicle, while the latter is capable of vertical movement by reason of the joint 8. It will be understood that movement may be imparted from the driving wheels to the frame of the vehicle by any suitable form of driving mechanism, and the axle and shaft housings, indicated as 6 and 7, are illustrated and described as being broadly typical of means for connecting the rear wheels of the vehicle together and of connecting them to the frame in such a way that independent movement of the wheels and frame is permitted. The expression "vehicle frame" as I have employed it, will be understood to comprehend the load carrying member whether or not it is separate from the body. In the illustration the frame of the vehicle is shown as comprising the side pieces 10 and 11 connected at their rear ends by a cross-piece 12 and elsewhere as may be desired. In order to provide for the amplitude of movement afforded by my improved supporting mechanism the side pieces of the frame are curved upwardly at their rear ends, as indicated at 13.

The mechanism by which the frame of the vehicle is yieldingly supported comprises one or more, preferably two, semi-elliptic leaf springs 14, anchored on the axle housing 6 and carrying at their rear ends the weight of the vehicle frame. These springs are held in horizontal position by a connection extending from their forward ends to the underlying driving frame piece represented by the housings 6 and 7. In the present illustrations I have shown a means of attachment for the forward ends of the springs 14 comprising arms 15 extending laterally from the driving frame piece, to which are connected the lower ends of pivoted links 16, the upper ends of which are pivoted in the eyes 17 of said springs. The latter are supported solely on the driving frame piece and are not connected to the frame, but serve as the supporting means for another intermediate set of springs which, while permitting the springs 14 to be made comparatively short and stiff, add materially to the resiliency of the supporting mechanism of the frame as a whole and add to the easy riding qualities of the body carried thereon.

Extending between the rear ends of the springs 14 is a connecting bar or member, preferably in the form of a bridge piece having a central horizontal portion 18 and upwardly extending converging ends 19. The bridge piece is held in operative position by radius bars 20, which are pivoted at one end, as indicated at 21, to the caps 22 of the spring clips and at their other ends to bosses 23 on the arms 19. Suspended from the central portion 18 of the bridge piece are a plurality of extensible coil springs 24, which are attached at their lower extremities to an inverted truss comprising a horizontal portion 25 and the ends 26 comprising brackets which are attached rigidly to the rear ends of the side pieces 10 and 11 of the frame. The brackets converge at their lower ends to provide clearance for the truss within the main springs 14. By extending the bridge piece, or connecting member, between the springs 14 upwardly from the ends of the latter and projecting the companion truss member on the rear of the vehicle frame downwardly, a separation of these parts is obtained whereby the coil springs 24 may be made of sufficient length to insure against set or crystallization of their metal and afford all of the resiliency that is required to absorb the reaction of the springs 14 and at the same time be of sufficient strength to support the seat carrying member or frame.

In order to obviate the lateral swinging motion of the frame which is suspended on the spring 24 I provide means on the underlying driving frame piece which guides the vehicle frame in a vertical direction. In the illustrations the guiding devices are shown as comprising arms 27 pivoted at their forward ends to the side pieces 10 and 11 of the main frame, as indicated at 28 and pivotally attached at their rear ends at the pivotal points of the forward ends of the springs 14 and links 16. As a convenient means of assembling these parts I utilize single bolts 29 which may be passed through the arms 27, links 16 and the eyes 17 of the springs.

I claim as my invention:

1. In a vehicle, the combination with a frame, forward supporting wheels connected thereto, rear supporting wheels having a connecting axle member and an extension projecting forwardly therefrom and pivoted to the frame, of springs mounted on the axle and extending forwardly and rearwardly therefrom and stabilizing connections between their forward ends and said connecting member, a suspension bar carried by the rear ends of the springs and means yieldingly supporting the frame on said bar.

2. In a vehicle, the combination with a frame, forward wheels supporting it, other wheels located beneath the rear of the frame and means connecting said wheels and also yieldingly holding them in place beneath the frame, of leaf springs held in horizontal position on said connecting means having ends extending in rear of the vehicle frame, a bridge piece mounted on the ends of said springs and other springs carried by the bridge piece and supporting the vehicle frame.

3. In a vehicle, the combination with a frame, a pair of forward wheels thereon, rear wheels at the other end of the frame and a member axially connecting the rear wheels together and connecting them to the frame, of leaf springs mounted on said connecting member at the sides of the frame, a suspension bar extending across the width of the frame and carried by said springs and other springs carried by said bar and supporting the vehicle frame.

4. In a vehicle, the combination with a frame, forward wheels thereon, rear wheels adapted to drive the vehicle and a driving member axially connecting the wheels and attached to the frame at a point in advance of the rear wheels, of two sets of springs interposed between said driving member and frame, one set being leaf springs connected only to the driving member, the other set being a plurality of coil springs supported on the first mentioned springs and connected only to the frame.

5. In a vehicle, the combination with a frame, forward wheels thereon, rear wheels and a driving frame piece axially connecting the rear wheels and attached to the vehicle frame, of horizontally disposed springs supported on the driving frame piece, a bridge piece carried by said springs and coil springs suspended therefrom and attached to the vehicle frame.

6. In a vehicle, the combination with a frame, forward wheels thereon, rear wheels and a driving frame piece axially connecting the rear wheels and pivotally attached to the vehicle frame, of leaf springs anchored centrally and at their forward ends to the driving frame piece, a bridge piece extending upwardly from and pivoted on the rear ends of the springs, a strut holding it in working position and other springs carried by the bridge piece and supporting the vehicle frame.

7. In a vehicle, the combination with a frame, forward wheels thereon, rear wheels and a driving frame piece axially connecting the rear wheels and pivotally attached at its forward end to the vehicle frame, of a guiding connection between said frame piece and the vehicle frame to prevent side sway of the latter in its movement relative to the former, leaf springs carried by the driving frame piece having rearwardly projecting ends, a connecting member between said spring ends and other springs carried by said connecting member and supporting the vehicle frame.

8. In an automobile, the combination with a pair of rear driving wheels, a driving frame piece connecting them and extending forwardly therefrom, a body frame located above said parts and pivotally attached to the driving frame piece at its forward end and wheels supporting the forward end of the body frame, of leaf springs supported on the driving frame piece and disposed with their ends projecting at opposite sides of the axis of the rear wheels, links connecting the forward ends of said springs to both of said frames, a member connecting the rear ends of said springs, and other springs carried by said member and supporting the body frame.

9. The combination with an automobile comprising pairs of forward and rear wheels, a frame, a connected rear axle and a driving shaft housing carried by the wheels and pivoted to said frame, of laterally extending arms fixed to said housing forward of the rear axle, springs mounted on the latter having their forward ends attached to said arms, a member connecting the rear ends of the springs and other springs carried by the connecting member and supporting the frame.

10. The combination with an automobile comprising pairs of forward and rear wheels, a frame, a connected rear axle and a driving shaft housing carried by the wheels and pivoted to said frame, of laterally extending arms fixed to said housing forward of the rear axle, springs mounted on the latter having their forward ends attached to said arms, a bridge piece connecting the rear ends of the springs and extending upwardly therefrom, a truss extending downwardly across the rear end of the frame and springs connected to said bridge piece and truss.

11. The combination with an automobile comprising pairs of forward and rear wheels, a frame thereover and connected rear axle and driving shaft housings carried by the rear wheels and connected to the frame, of rigid arms projecting laterally from one of the housings, leaf springs carried by the axle housing and having rearwardly projecting ends, a member connecting the said ends of the springs, other springs carried by the connecting member and supporting the frame and guide members on the ends of the rigid arms overlying the sides of the frame and serving to limit its lateral movement.

CHARLES J. PEMBROKE.

Witnesses:
G. WILLARD RICH,
RUSSELL B. GRIFFITH.

Copies of this patent may be obtained for five cents each, by addressing the "Commissioner of Patents, Washington, D. C."